E. R. ECKMAN.
BURGLAR TRAP VAULT.
APPLICATION FILED NOV. 3, 1909.

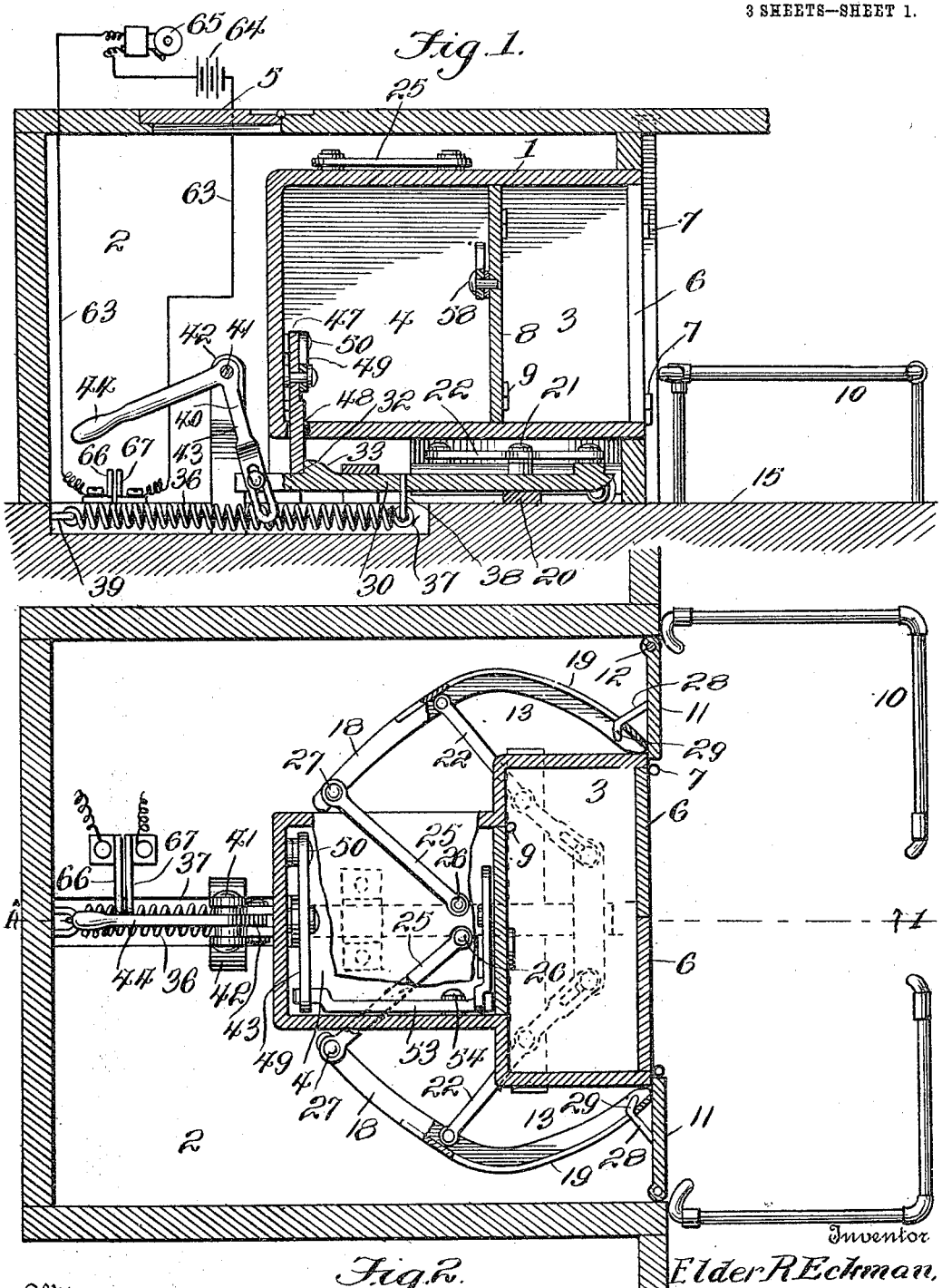

948,922.

Patented Feb. 8, 1910.

3 SHEETS—SHEET 2.

Witnesses

Inventor
Elder R. Eckman,
By Victor J. Evans,
Attorney

E. R. ECKMAN.
BURGLAR TRAP VAULT.
APPLICATION FILED NOV. 3, 1909.

948,922.

Patented Feb. 8, 1910.
3 SHEETS—SHEET 3.

Witnesses
J. T. L. Wright
J. W. Garner

Inventor
Elder R. Eckman,
By Victor J. Evans
Attorney

UNITED STATES PATENT OFFICE.

ELDER R. ECKMAN, OF COUNCIL GROVE, KANSAS.

BURGLAR-TRAP VAULT.

948,922.  Specification of Letters Patent.  Patented Feb. 8, 1910.

Application filed November 3, 1909. Serial No. 526,117.

*To all whom it may concern:*

Be it known that I, ELDER R. ECKMAN, a citizen of the United States, residing at Council Grove, in the county of Morris and State of Kansas, have invented new and useful Improvements in Burglar-Trap Vaults, of which the following is a specification.

This invention is a burglar trap for safe vaults and similar structures in banks and other financial institutions, for catching a burglar in the attempt to enter the vault, the said invention consisting in the construction, combination and arrangement of devices hereinafter described and claimed.

Figure 3:
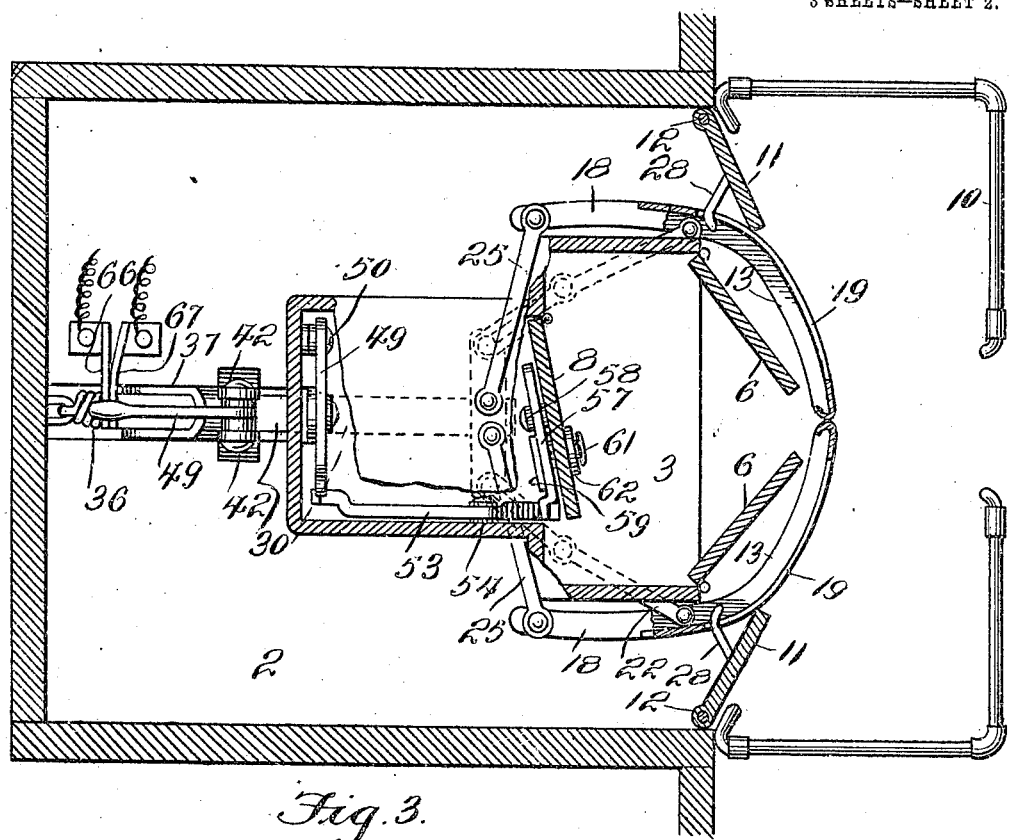
Figure 5:
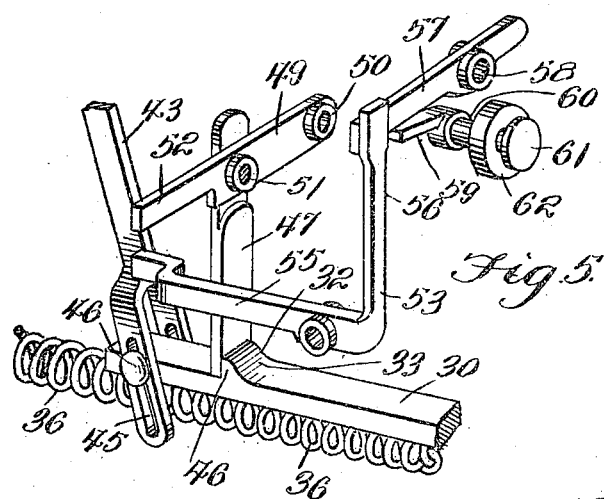
Figure 4:
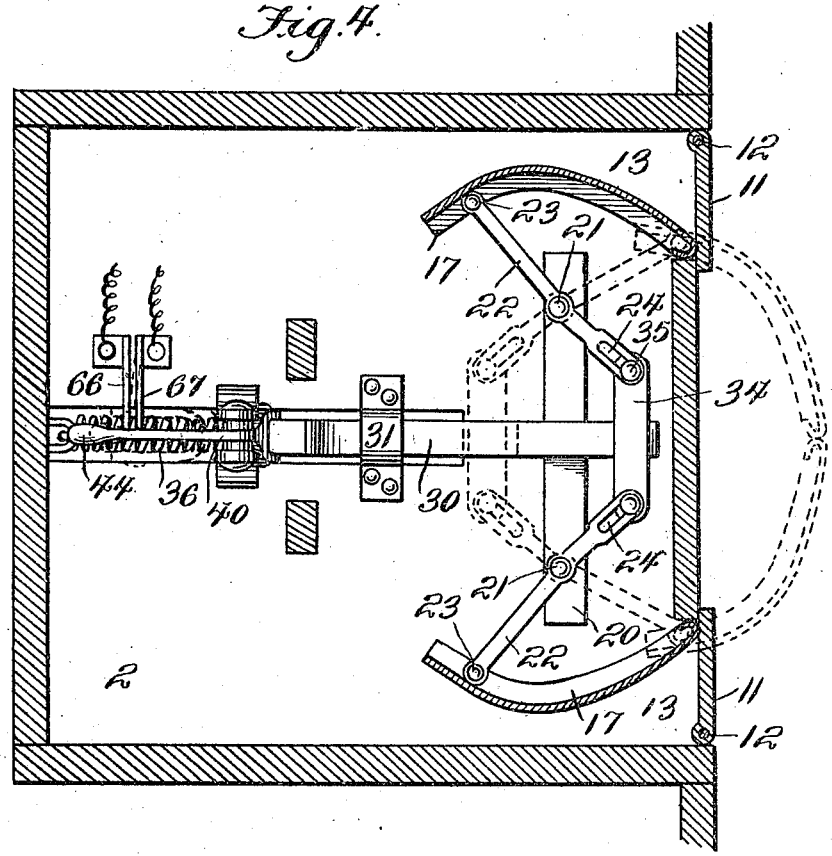
Figure 6:
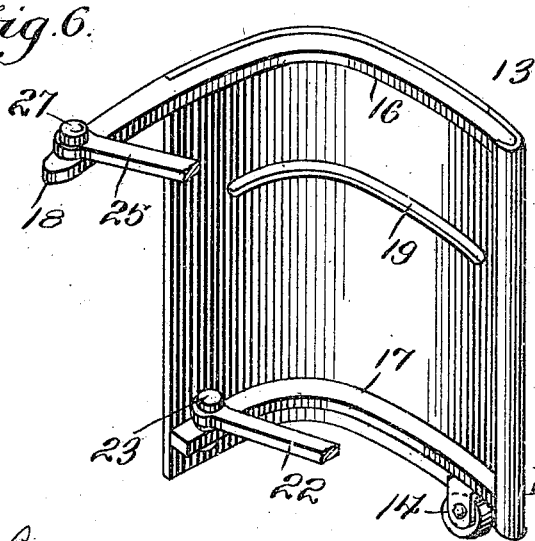

In the accompanying drawings:—Figure 1 is a vertical longitudinal central sectional view of a safe vault provided with a burglar trap mechanism constructed in accordance with my invention. Fig. 2 is a horizontal sectional view of the same, with a portion of the safe vault shown in plan, the doors of the vault being shown closed and the trap doors open. Fig. 3 is a similar view of the same, showing the doors of the vault open and the trapping doors closed so as to entrap a person attempting to enter the vault. Fig. 4 is a horizontal sectional view on a plane below the safe. Fig. 5 is a detail perspective view of a portion of the trapping door actuating mechanism and also of the trip device for releasing the detent of the actuating mechanism when the inner safe or vault door is opened. Fig. 6 is a detail perspective view of one of the trapping doors.

My improved burglar trap mechanism is here shown in connection with a safe 1 which is installed in a vault chamber or other suitable structure 2, the safe having an outer or vestibule chamber 3 and an inner chamber 4. The vault 2 is here shown as provided in its roof with a trap door 5 by which alone the vault can be entered for the purpose of setting the trapping mechanism, the trapping mechanism being otherwise inaccessible.

The outer doors of the safe are indicated at 6, and are adapted to swing open on the hinges 7.

The inner door of the vault of the safe between the inner chamber thereof and the outer or vestibule chamber is indicated at 8 hinged at one side as at 9.

A rail of usual construction is indicated without the front of the vault or safe at 10 and between the side walls of the vault 2 and those of the safe, at the front end of the safe, are concealing doors 11 which are shown hinged at their outer sides as at 12 and are normally in closed position so as to entirely conceal the interior of the vault.

On opposite sides of the safe are reversely curved trapping doors 13 which are provided at their lower sides near their front ends with rollers 14 which run on the floor 15 of the vault. In practice, these trapping doors are made of plate metal such as steel and are provided on their inner sides with reinforcing bars 16—17 which are respectively at their upper and lower inner edges, the upper bars 16 having rearwardly extending arms 18. Each trap door has a slot 19 extending from near its front edge to a point within a suitable distance of its rear edge. The safe is spaced somewhat above the bottom of the vault and a bar 20 is here shown on the floor of the vault below the safe and at a suitable distance from the front side thereof, the said bar being securely fastened in place and being provided on its upper side with pivots 21 for locking levers 22. Each of the said locking levers is pivotally connected at its outer end as at 23 to the bar 17 of one of the trapping doors at a point near the rear side of said trapping door. The inner end portions of the said levers are provided with slots 24. On the upper side of the safe are pivoted the inner ends of a pair of link arms 25 as at 26, the outer ends of said link arms being pivotally connected to the rear arms 18 of the bars 16 of the trapping doors as at 27. Each concealing door 11 has an arm or link 28 which extends from the inner side thereof through the slot 19 of one of the trapping doors and is provided with a hook or head 29 at its inner end to bear against the inner side of said trapping door, so that the concealing doors are by the provision of the said arms 28 and the heads 29 slidably connected to the trapping doors so that when the trapping doors are open as shown in Fig. 2, the concealing doors are closed and serve to effectually conceal all traces of the trapping doors. The concealing doors lie normally against the outer edges of the trapping doors as shown in Fig. 2 and when the trapping doors are closed to the position indicated in Fig. 3 by the actuating mechanism hereinafter described the first closing movement of the trapping doors causes them to partially open the concealing doors so that the latter clear the trapping doors and enable the trapping doors to close.

I will now describe the actuating mechanism for closing the trapping doors on an attempt to open the inner safe door 8. A longitudinally movable bar 30 operates in a guide 31 which is on the vault floor and below the safe. Said bar 30 is provided at a suitable distance from its rear end and on its upper side with a stop shoulder 32 the rear side of which is vertical and the front side of which is inclined as at 33 so that said stop shoulder also constitutes a cam. A cross bar 34 is at the front end of and is movable with the longitudinally movable bar 30. Pivots 35 which operate in the slots 24 of the arms 22 connect said arms to the said cross bar 24. A spring 36, which is here shown as a coiled spring, disposed in a recess 37 in the floor of the vault has its front end connected as at 38 to the longitudinally movable bar 30 and its rear end connected as at 39 to the rear wall of the vault. A setting lever 40 which is fulcrumed as at 41 between a pair of standards 42 which rise from the vault floor has an arm 43 and a lever arm 44. Said arm 43 has its lower end bifurcated and provided with slots 45. The rear portion of the longitudinally movable bar 30 fits between the bifurcated portions of said lever arm 43 and is connected thereto by means of a pivot bolt 46 which operates in the slots 45. In the rear side of the safe is a vertically movable detent 47 which extends through a guide opening 48 in the bottom of the safe and bears on the upper side of the longitudinally movable bar 30 and acts by gravity, when the bar 30 is moved forwardly by the setting lever 40 against the tension of the spring 36, to cause the lever arms 22 which are actuated by said longitudinally movable bar 30 to open the trapping doors 11. As the stop shoulder 32 passes under the detent its cam face causes the detent to rise and the detent then falls behind the said stop shoulder so as to lock the longitudinally movable bar 30 and, hence, the trapping doors and the concealing doors in initial position with the trapping doors set for operation, it being understood that in order to release the detent and cause the actuating mechanism to close the trapping doors together in front of the vault, it is only necessary to raise the detent and cause the latter to clear the stop shoulder 32 of the longitudinally movable bar 30. A tripping mechanism for thus releasing the detent is provided, which I will now describe.

The tappet bar 49 is pivotally mounted at one end as at 50 on the inner wall of the safe. Said tappet bar is pivotally connected as at 51 to the detent 47 and its arm 52 extends to within a slight distance of one side of the safe. In the said side of the safe is disposed a bell crank 53, the pivot of which is indicated at 54. Said bell crank has a normally horizontal tappet arm 55 which extends under the free or tappet end of the tappet bar 49 and also has a normally vertical arm 56 which, when the inner door 8 of the safe is closed, is engaged on its inner side by a trip bar 57 which is pivotally mounted on the inner side of the inner safe door as at 58. The said trip bar when the inner door 8 is closed, drops behind the upper end of the arm 56 of the bell crank, in position to partially turn the bell crank when the door 8 is opened so as to cause the arm 55 of the bell crank by engagement with the arm 52 of the tappet bar 49 to raise said tappet bar and, hence, the detent 47 and thereby cause the detent to release the longitudinally movable bar 30 with the result that instantly upon the partial opening of the inner safe door 8, the trapping doors 19 will be closed and the person attempting to enter the inner chamber of the safe will be entrapped and can not get away. To operate the trip bar, I provide an arm 59 which is below the said trip bar and is at the inner end of a shaft 60 which is mounted in the inner door 8 of the safe. Said shaft has a knob 61 whereby it may be turned and in practice a lock indicated at 62 is provided for the said shaft to prevent it from being turned by an unauthorized person. It will be understood that an authorized person having the combination of the lock 62 can before attempting or entering any chamber of the safe, partially turn the shaft 60 by means of the knob 61 so as to cause the arm 59 to raise the trip bar 57 clear of the arm 56 of the bell crank 53 so that the door 8 can be opened without operating the releasing means for the trapping door actuating mechanism.

An electric circuit is indicated at 63 which includes a battery 64 and an electric bell or gong 65 and also includes a circuit breaker indicated as a pair of spring conducting arms 66—67 which normally open apart so as to break the circuit. The arm 67 is in the path of the longitudinally movable bar 30 and when the latter is released by the detent and actuated by the spring 36 to close the burglar trapping doors, said bar 30 comes in contact with the said arm or leaf 67 and closes it against the arm 66 thereby completing the circuit and causing the electric alarm to be sounded. It will be understood that electrical connections can be also had with police headquarters or any other point so as to summon assistance in the event of the springing of the trap by an unauthorized attempt to enter the safe.

Having thus described the invention, what is claimed, is:—

1. A structure of the class described having a door, a trapping door, actuating means for the trapping door, a movable detent for the actuating means, a tappet element for said movable detent, a bell crank having two arms one of which is movable in the path of said tappet element to actuate the latter, a trip bar mounted on and carried by the first-mentioned door, said trip bar being adapted when said first-mentioned door is opened to engage the other arm of the bell crank and cause the latter to actuate said element and said detent, and means also carried by said first-mentioned door to move said trip bar to a position which will cause the same to clear without operating said bell crank when said first mentioned door is opened.

2. A structure of the class described having a door, and a pair of trapping doors, mounted for pivotal movement, actuating mechanism for the trapping doors including an element having a stop, a detent to co-act with said stop element to prevent operation of said actuating mechanism, and means actuated by the movement of the first-mentioned door to release the detent and cause the actuating mechanism to close said trapping doors.

3. A structure of the class described having a door, a trapping door, actuating means for the trapping door, a detent for the actuating means, a trip mechanism actuated by the first-mentioned door when the latter opens to release the detent and cause the actuating means to close the trapping door, and a concealing door connected to the trapping door and concealing the latter when the trapping door is open.

4. A structure of the class described having a trapping door, means to actuate the same, and a concealing door connected to the trapping door for the purpose set forth.

5. In a structure of the class described, the combination of a trapping door movable into open or closed position, and a concealing door connected to the trapping door and actuated by the movements of the latter to conceal said trapping door when said trapping door is in open position.

In testimony whereof I affix my signature in presence of two witnesses.

ELDER R. ECKMAN.

Witnesses:
C. L. HAUCKE,
MATTIE STRAIGHT.